United States Patent [19]
Wecker

[11] Patent Number: 5,806,077
[45] Date of Patent: Sep. 8, 1998

[54] HYPERTEXT DISPLAY SYSTEM

[75] Inventor: Alan J. Wecker, Haifa, Israel

[73] Assignee: International Business Machines Corporation, Armonk, N.Y.

[21] Appl. No.: 4,016

[22] Filed: Jan. 15, 1993

[51] Int. Cl.$^6$ .................................................. G06T 1/00
[52] U.S. Cl. ...................... 707/501; 345/346; 345/347
[58] Field of Search ................... 395/144, 145, 395/155, 159, 160, 161, 600; 364/419.07, 419.19; 707/501; 345/346, 347

[56] References Cited

U.S. PATENT DOCUMENTS

| | | | |
|---|---|---|---|
| 5,159,669 | 10/1992 | Trigg et al. ............................ | 395/159 |
| 5,199,104 | 3/1993 | Hirayama ............................... | 395/145 |
| 5,204,947 | 4/1993 | Bernstein et al. ..................... | 395/157 |
| 5,297,249 | 3/1994 | Bernstein et al. ..................... | 395/600 |

OTHER PUBLICATIONS

Monk, "The Personal Browser: A Tool for Directed Navigation in Hypertext Systems", Interacting with Computers: The Interdisciplinary Journal of Human–Computer Interaction, vol. 1 No. 2 (Aug. 1989), pp. 190–196.

Bernstein, "The Bookmark and the Compass: Orientation Tools for Hypertext Users", ACM SIGOIS Bulletin, vol. 9 No. 4 (Oct. 1988), pp. 34–45.

Nielsen, "Through Hypertext", Communications of the ACM, vol. 33 No. 3 (Mar. 1990), pp. 297–310.

Yankelovich et al., "Intermedia: The Concept and the Construction of a Seamless Information Environment", IEEE Computer (Jan. 1988/pp. 81–96.

Foss, "Tools for Reading and Browsing Hypertext", Information Processing & Management, vol. 25 No. 4 (1989), pp. 407–418.

Marshall et al., "Guided Tours and On–line Presentations: How Authors Make Existing Hypertext Intelligible for Readers", ACM Hypertext '89 Proceeding (1989), pp. 15–26.

Goodman, "The Complete Hyper Card Handbook", Bantam Books (1987) pp. 32–34.

*Primary Examiner*—Joseph H. Feild
*Attorney, Agent, or Firm*—Edward J. Duffield; Andrew J. Dillon

[57] ABSTRACT

A hypertext display system is described in which displayed hypertext links contain a marker indicating whether or not the unit of information to which the link leads has previously been visited by the user, the system being characterized in that the user can cause the display of further information regarding previous visits to that unit of information via a predetermined user input operation at a time when a display cursor is located within the boundaries of the marker. Active markers or footprints are employed associated with links leading to nodes the user has already visited. In one implementation using a graphical user interface, these markers are icons for timestamp windows. The user can activate the markers in order to decide whether or not to revisit the node.

6 Claims, 2 Drawing Sheets

HYPERTEXT DISPLAY SYSTEM

FIELD OF THE INVENTION

The invention relates to hypertext display systems.

BACKGROUND OF THE INVENTION

Hypertext is a term used to describe a particular organization of information within a data processing system and its presentation to a user. It exploits the computer's ability to link together information from a wide variety of sources to provide the user with the ability to explore a particular topic. The traditional style of presentation used in books employs an organization of the information which is imposed upon it by limitations of the medium, namely fixed sized, sequential paper pages. Hypertext systems, however, use a large number of units of text or other types of data such as image information, graphical information, video information or sound information, which can vary in size. A collection of such units of information is termed a hypertext document. Sometimes hypertext documents employing information other than text are termed hypermedia documents.

Each of the different units is generally self-contained but contains references to other units. The references are made explicit in the form of "links". Each link is a relation between locations in two units of information. When a portion of a unit of information is displayed, links to locations in the displayed portion are indicated on the display to the user. A link can then act as a user-activated control. A user can act on a displayed link, either by clicking on it with a mouse or otherwise, to cause the particular unit which is the link target to be displayed. Normally, hypertext systems are window-based and the newly displayed unit appears in a new window. The new unit may, of course, contain further links which can be similarly activated to display other units of information. By following links the user "navigates" around the document. The user has a great deal of control over the order in which information is presented and can play a very active role in selecting what is of interest and how far to pursue a given topic.

However, the flexibility a user has in being able to freely move through the information by following links gives rise to serious usability problems. Indeed, much research and development work on hypertext systems has concentrated on optimizing ergonomic factors in the user interface which would enable a relatively unskilled user to use a hypertext system as easily as they would a conventional book.

One of these problems is that there is a great risk of a user becoming "disoriented" while navigating through a hypertext document. It is very easy for a user to become confused about exactly where they are in the document, where they have come from, and how the possibilities open to them at any particular time relate to the information they have already seen.

One study of this particular problem is described in "The Art of Navigating through Hypertext", J Neilson, Communications of the ACM, 33, p298, (1990). In this article a number of navigation aids to the user are described. One of these is what are alternatively called "footprints" or "breadcrumbs". These are features of displayed hypertext links which indicate to the user whether or not they have previously visited the node to which the link leads.

Also described are what are known as "timestamps". Each time a user returns to a location they have previously visited, the system displays the time which has elapsed since the user's previous visit to the location. If a user visits a node they have not previously visited, the system informs them of this fact in the time stamp. This facility is intended to help readers recognize information they have already seen without having to wonder if they actually have seen it before. However a drawback with this technique is that it represents one more piece of information which has to be displayed, thus consuming valuable screen space and increasing screen clutter. In addition, there is always the possibility that the window in which this information is displayed be obscured by other windows on the screen.

SUMMARY OF THE INVENTION

According to the present invention there is provided a hypertext display system in which displayed hypertext links contain a marker indicating whether or not the unit of information to which the link leads has previously been visited by the user, the system being characterized in that the user can cause the display of further information regarding previous visits to that unit of information via a predetermined user input operation at a time when a display cursor is within the boundaries of the marker.

The invention thus provides a simple device by which, without the user being presented with a large amount of information or the display surface being overly cluttered, a user, nevertheless, has information conveniently available to them which, if required, will help them to decide whether or not to follow any particular link. This is achieved by employing "active" markers or footprints associated with links leading to nodes the user has already visited. In an implementation having a graphical user interface, these markers can be icons for the timestamp windows or, alternatively, in an implementation having a character-based user interface they could be characters of particular type such as, for instance, an asterisk. The user can activate the markers in order to decide whether or not to revisit the node.

This arrangement is especially convenient for the user because usually in hypertext systems, to follow a link, the user has to perform a user input operation when the screen cursor is in the region of the screen where the link is displayed. Since the marker is included in, or is in close proximity to or may even be co-extensive with, this region, very little movement of the screen cursor is required in order to activate the footprint. The usability of the hypertext system is therefore considerably improved.

In an embodiment of the invention in which, when a user can follow a plurality of hypertext links from a given location in a displayed unit of information, the user can cause display of the plurality of links via a second predetermined user input operations the markers are associated with the displayed links as above and a marker indicating whether or not all the units of information to which the plurality of links lead have been previously visited by the user is displayed at the given location in the displayed unit of information. The user is able to cause the display of further information regarding previous visits to those units of information via the first predetermined user input operation at a time when a display cursor is located within the boundaries of this marker.

In a preferred form of the invention, when the further information is displayed, the user can cause, via a third predetermined user input operation when the screen cursor is located within a predefined region of the screen, the information and the marker to be reset as if the user had never visited the node to which the information and the marker relate. The hypertext display system can also include means for causing the information and the marker to be reset as if the user had never visited the node to which they relate after a predetermined time has elapsed since the user's last visit to that node.

After a prolonged period of use all or most nodes are likely to be visited by the user. The usefulness of the markers to distinguish those nodes the user has visited from those they have not is thus considerably enhanced by these features.

The predetermined user input operations can be the operation by the user of predetermined mouse button or buttons. The further information can include the time the unit of information was first seen by the user, the time the unit of information was last seen by the user and how many times the user has seen the unit of information. The hypertext display system can include means for storing a hypertext document for display.

DETAILED DESCRIPTION OF THE INVENTION

Figure 1:
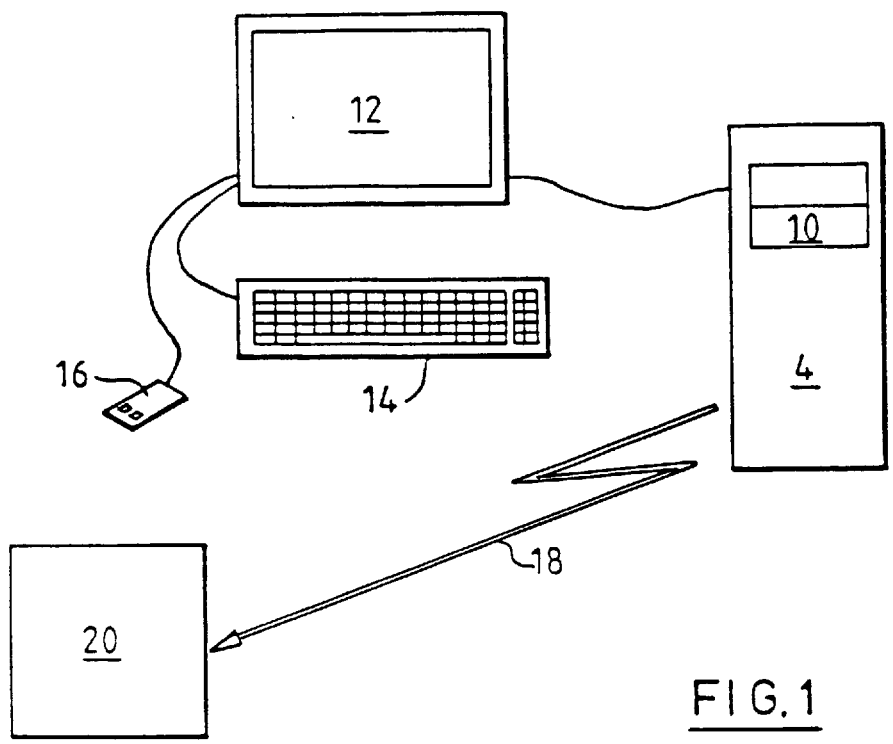
FIG. 1 shows a hypertext display system according to an embodiment of the present invention.

An embodiment of the invention will now be described. FIG. 1 is a diagram of a hypertext display system according to one embodiment of the invention. It shows a general purpose computer workstation having a system unit 4, a disk drive for data storage 10, a display 12 and user input devices, keyboard 14 and mouse 16. The workstation may be connected via communications link 18 to another computer or computers designated generally as 20.

It should be noted that the hypertext display system according to the invention could be of another type, such as a mainframe system to which dumb terminals are connected, and could be either a single-user or a multiple-user system.

In this embodiment of the invention a hypertext document is assumed to be stored in the form of at least one data set stored in the disk storage 10. Of course, it will be understood that the hypertext document need not be stored in the hypertext display system itself, but rather could be centrally stored and accessed via a communications link by a number of similar display systems as the need arises.

For the purposes of illustrating the invention it is further assumed that the component data sets of the hypertext document are text files, however it should be noted that the essential features of the invention would apply equally well to image or graphics data or indeed to any kind of data which may participate in a hypertext document.

Figure 2:
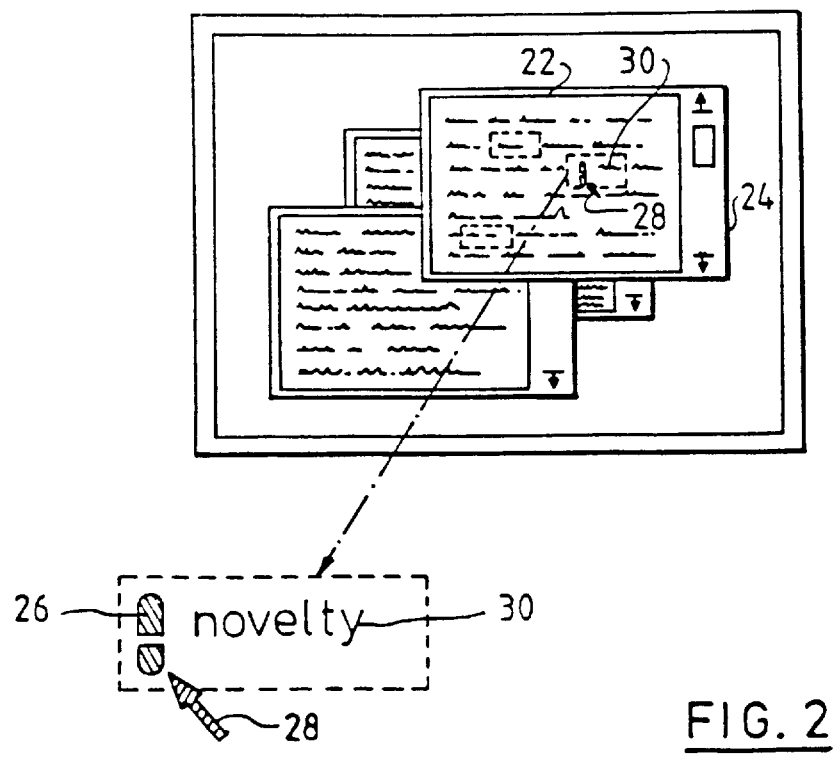
FIGS. 2 and 3 show views of the display screen when the hypertext display system is in use.

FIG. 2 shows a view of the display screen 12 when the hypertext system is in use. Portions of the units of information that the user has visited, in this case text files, are displayed in separate windows 22 on the screen. The user can scroll through each unit of text using scroll bar 24 in a manner well understood in the art. The locations of links to other units of information are indicated on the text. In FIG. 2 these are shown by a word 30 which is surrounded by a dotted line. It should be noted that there are many other ways in which these links could be indicated, such as, for instance, showing the word in another color or using another text font. The user follows a link by pressing a button on mouse 16 when the screen cursor 28 is located in the vicinity of the indication. In this example, pressing of the button while the screen cursor is within the dotted boundary would cause the unit of text to which the link leads to appear in a new window.

Associated with links to units of text which the user has already visited, either on this occasion or during any previous use of the system by the user, are markers 26, in this case in the form of footprints, which indicate to the user the fact that they have visited that unit of information. In this case the markers are either present or not depending on whether the unit of information has been visited or not by the user. Other ways could be used of conveying this information such as markers which change their color, shape or form. Alternatively, the method of indicating the link could be varied depending on whether or not the unit of information to which the link leads has been visited.

Figure 3:
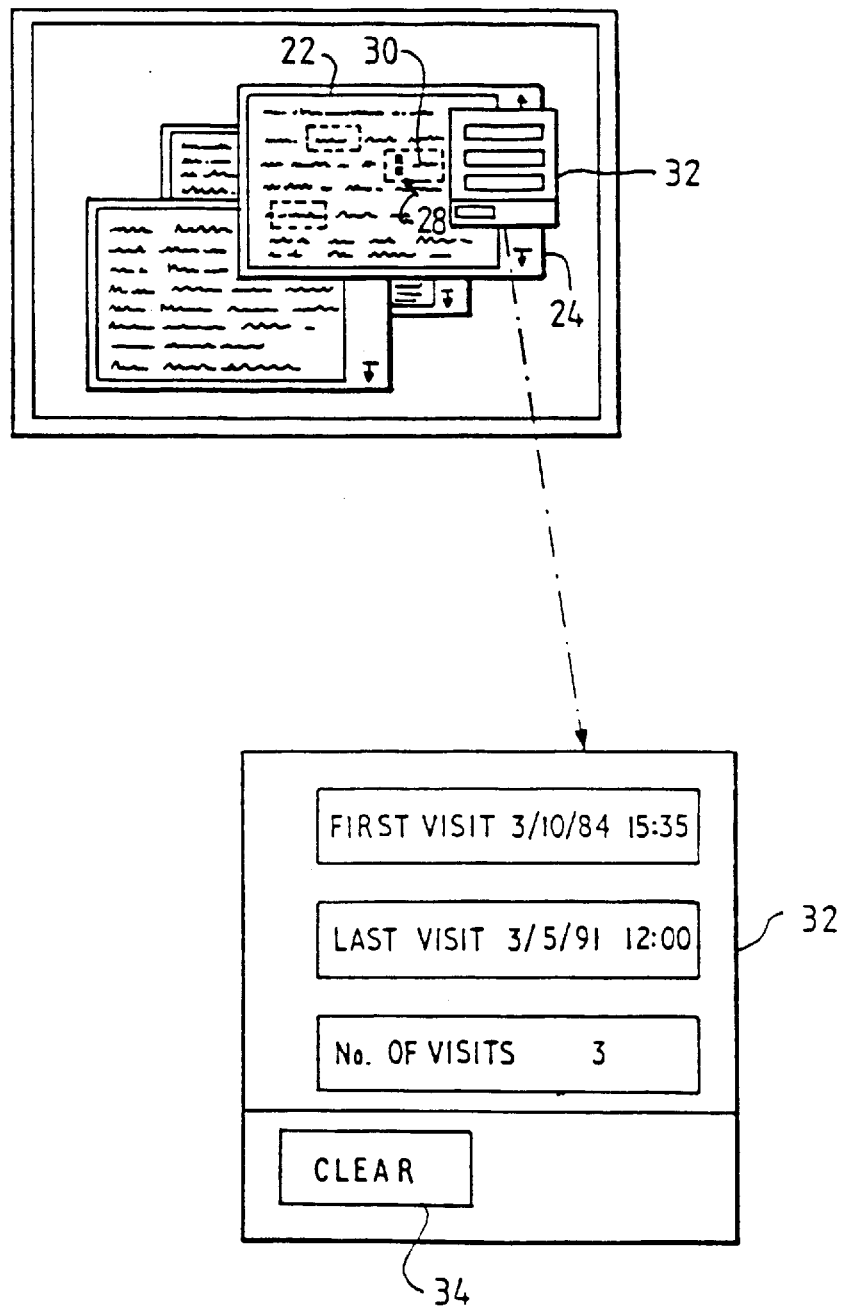

By pressing the mouse button while the screen cursor 28 is located over the marker 26, the user can cause an information window 32 to be displayed. This is shown in FIG. 3. The information window contains further information relating to the user's previous visits to the node.

Other types of user input operation could be used for this purpose, for example use could be made of the keyboard or, in the case where the marker is co-extensive with the displayed link, a different combination of mouse buttons could be used to enable to user to follow the link or to enable the information window to be displayed.

In the case where a single location in the displayed unit of information is linked via a number of links to a number of different units of information, the user can cause a list of these links to be displayed by activating the link indication. The markers are associated with the individual displayed links in this list. If all the individual links in the displayed list have a marker associated with them, then a marker is associated with the indication in the displayed unit of information. Activation of this marker causes information relating to the user's previous visits to all the nodes in the list to be displayed.

In this embodiment of the invention this information is the time, in a suitable form and including relevant date information, of the user's first and last visits to the node And the number of visits they have made to the node. It will be understood that the time can be expressed in a number of ways, for example, as an elapsed time or as an absolute time.

The information regarding the user's visits to each unit of information is stored in a file in disk storage 10. Each user of the system has their own file for this purpose. Each time the user opens the information window, this file is inspected by the system to obtain the information for display. Again it will ho understood that there are many ways in which this information could be stored. It need not, for example, be stored in the same place as the hypertext document and each user need not have their own file. The information could, for example, be centrally stored together with security information determining the user's access to various parts of the system or the hypertext document.

The information window includes a region 34, marked "CLEAR". The user can cause the information regarding their visits to the node to be reset, i.e. to be as if they had never visited the node, by pressing the mouse button while the screen cursor is located in this region.

The hypertext display system of this embodiment of the invention has as a further feature a time-out so that if a user does not visit a node for a preset length of time the information and the marker will be reset as if they had never visited the node. This avoids the problem that after a while all nodes will be visited by the user and will accordingly have a marker associated with links to them. If this was allowed to become the case, the usefulness of the markers to distinguish those nodes the user has visited from those they have not would be diminished. The markers also "fade" in this embodiment after a shorter preset length of time. For example, they may change their color from black to grey, say after 3 days has elapsed since the users last visit to the node, before vanishing when the information is reset after 5 days has elapsed.

While the invention has been particularly shown and described with reference to preferred embodiments thereof, it will be understood by those skilled in the art that various changes in form and details may be made therein without departing from the spirit and scope of the invention.

What is claimed is:

1. A method of providing hypertext link services within a data processing system having a display, said method comprising the data processing implemented steps of:

displaying a hypertext document within said display;

graphically displaying at least one hypertext link indicator within said hypertext document, said hypertext link indicator indicating an existence of an additional unit of information;

graphically displaying in association with said at least one hypertext link indicator within said hypertext document a marker indicating a previous display of said additional unit of information;

selectively displaying said additional unit of information within said display in response to a selection of said hypertext link indicator by a user of said data processing system; and selectively displaying utilization data indicating a date and time of a first utilization by said user with respect to said additional unit of information within an information window within said display in response to a selection of said marker by a user of said data processing system, wherein said utilization data may be visually accessed by a user without display of said additional unit of information.

2. The method according to claim 1, further including the step of reinitializing said utilization data within said information window in response to an input to said data processing system by said user.

3. A system for providing hypertext link services within a data processing system having a display, said system comprising:

means for displaying a hypertext document within said display;

means for graphically displaying at least one hypertext link indicator within said hypertext document, said hypertext link indication indicating an existence of an additional unit of information;

means for graphically displaying in association with said at least one hypertext link indicator within said hypertext document a marker indicating a previous display of said additional unit of information;

means for selectively displaying said additional unit of information within said display in response to a selection of said hypertext link indicator by a user of said data processing system; and means for selectively displaying utilization data indicating a date and time of a first utilization by said user with respect to said additional unit of information within an information window within said display in response to a selection of said marker by a user of said data processing system, wherein said utilization data may be visually accessed by a user without display of said additional unit of information.

4. The system according to claim 3, further including means for reinitializing said utilization data within said information window in response to an input to said data processing system by said user.

5. A method of providing hypertext link services within a data processing system having a display, said method comprising the data processing implemented steps of:

displaying a hypertext document within said display;

graphically displaying at least one hypertext link indicator within said hypertext document, said hypertext link indicator indicating an existence of an additional unit of information;

graphically displaying in association with said at least one hypertext link indicator within said hypertext document a marker indicating a previous display of said additional unit of information;

selectively displaying said additional unit of information within said display in response to a selection of said hypertext link indicator by a user of said data processing system; and selectively displaying utilization data indicating a date and time of a most recent utilization by said user with respect to said additional unit of information within an information window within said display in response to a selection of said marker by a user of said data processing system, wherein said utilization data may be visually accessed by a user without display of said additional unit of information.

6. A system for providing hypertext link services within a data processing system having a display, said system comprising:

means for displaying a hypertext document within said display;

means for graphically displaying at least one hypertext link indicator within said hypertext document, said hypertext link indication indicating an existence of an additional unit of information;

means for graphically displaying in association with said at least one hypertext link indicator within said hypertext document a marker indicating a previous display of said additional unit of information;

means for selectively displaying said additional unit of information within said display in response to a selection of said hypertext link indicator by a user of said data processing system; and means for selectively displaying utilization data indicating a date and time of a most recent utilization by said user with respect to said additional unit of information within an information window within said display in response to a selection of said marker by a user of said data processing system, wherein said utilization data may be visually accessed by a user without display of said additional unit of information.

* * * * *